Oct. 25, 1932.　　　　M. D. MILLER　　　　1,884,803
SOIL PULVERIZER
Filed March 8, 1930
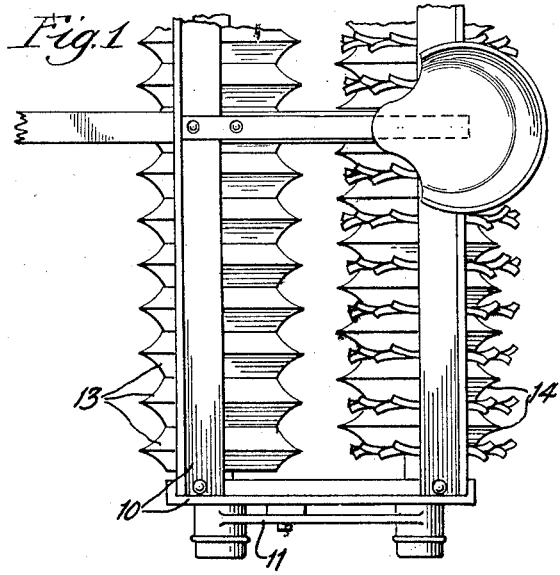
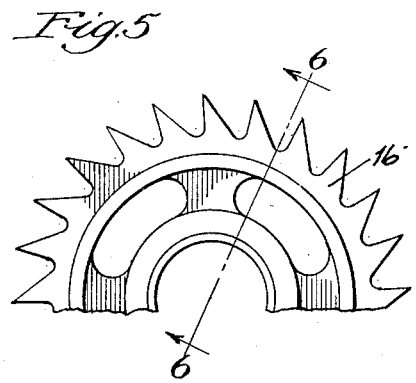
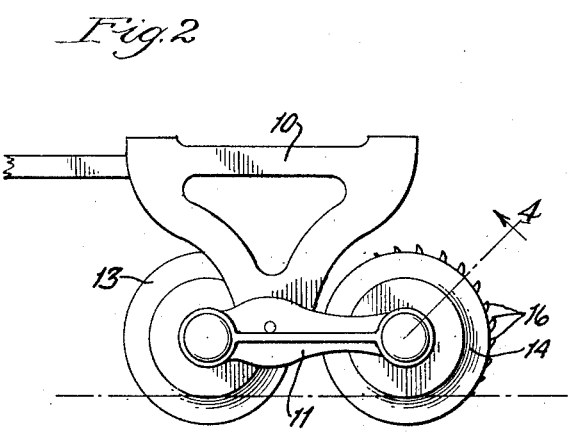
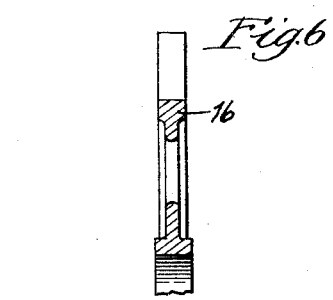
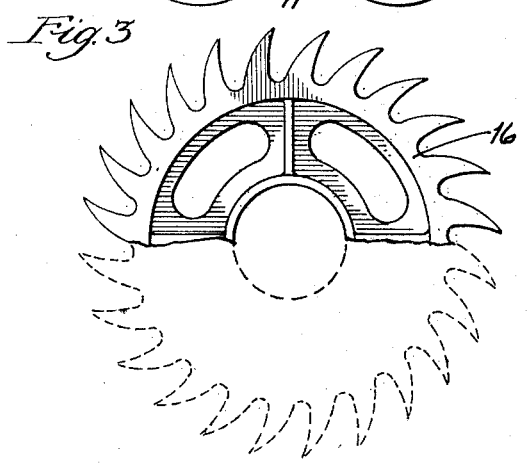
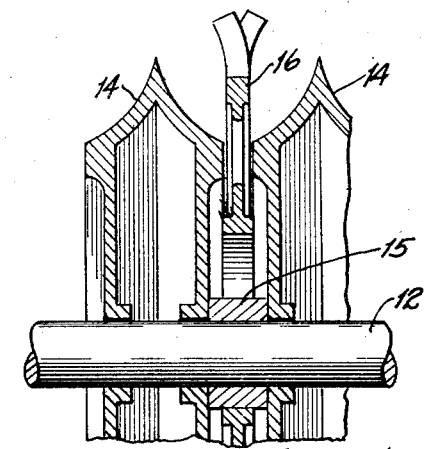

Patented Oct. 25, 1932

1,884,803

UNITED STATES PATENT OFFICE

MYRON D. MILLER, OF BEREA, OHIO, ASSIGNOR, BY MESNE ASSIGNMENTS, TO THE DUNHAM COMPANY (1931), OF BEREA, OHIO, A CORPORATION OF OHIO

SOIL PULVERIZER

Application filed March 8, 1930. Serial No. 434,213.

An object of this invention is to provide a soil pulverizer with an improved means for dislodging soil from the space between the curved peripheries of adjacent roller elements.

Another object is to provide an improved form of the sprocket between pulverizer roller elements which will effectually loosen and mulsh soil through which it has passed.

These and other objects, as will hereinafter appear, are accomplished by this invention, which is fully described in the following specification and shown in the accompanying drawing, in which—

Figure 1 is a top plan view of a soil pulverizer embodying this invention;

Fig. 2 is an end elevation of the same;

Fig. 3 is an enlarged front elevation of the preferred form of the sprocket wheel;

Fig. 4 is an enlarged partial section on the line 4 of Fig. 2;

Fig. 5 is a view similar to Fig. 3 showing a modified form of the sprocket wheel; and Fig. 6 is a partial enlarged section on the line 6—6 of Fig. 5.

The embodiment illustrated in Figs. 1 to 4 comprises a weight frame 10, to each end of which is rockably connected a side frame 11, the ends of which carry bearings in which are mounted a front shaft (not shown) and a rear shaft 12 (Fig. 4).

The front shaft has rotatably mounted thereon a series of disk rollers 13, while the rear shaft has similarly rotatably mounted thereon disk rollers 14 which are somewhat narrower than the disk rollers 13. Between the disk rollers 14 are mounted the shaft spacers 15. Sprocket wheels 16 having central openings considerably larger than the spacers 15 are mounted thereon, as shown in Fig. 4, and lie between adjacent disk rollers 14.

The sprocket wheels 16, as shown in Figs. 2 and 3, have curved sprocket teeth preferably having chisel points of substantially the width of said teeth and which are preferably set to run in a forwardly direction, as shown in Fig. 2, so as to enable them to better penetrate the soil and to lift and loosen the soil as they leave it. For some purposes, however, it may be desirable to set them to run in the reverse direction, as shown in Fig. 3, wherein they will have a tendency to pack the soil as they pass through it when the wheel of Fig. 3 is made to travel to the left.

Figs. 1 to 4 show a preferred form of sprocket wheel in which the teeth are staggered by alternately offsetting them. Thus, as they lift the soil as they leave it, a much greater degree of stirring and mulshing is obtained than with any of the forms of sprocket wheels heretofore used for this purpose. This is particularly true where the teeth are forwardly curved, which enables them when running in a forward direction to penetrate the soil without much packing taking place. Again on leaving the soil, these same teeth loosen and lift it so that they leave the soil in a looser and more finely divided state than that in which they find it, due to the "set" of the tooth as well as to its curvature. The "kerf" of the teeth is thus much wider than the width of a kerf cut by the same wheel without offset teeth. This offsetting better cleans soil from the adjacent disk rollers and pulverizes a greater area of soil. Thus, a wider disk roller 14 is permissible and a greater pulverizing action is obtainable with a smaller number of parts. Staggered teeth, for a given spacing, are further apart and, since adjacent teeth are not in alignment, the soil passed over does not become wedged between them but tends to force out any soil previously retained therebetween.

It will be observed that in action the sprocket wheels tend to stand slightly above and to the rear of the disk rollers 14 with which they are associated. Thus, these sprocket wheels are the last to leave the soil as the machine passes over it, and their action is one of loosening and mulshing the soil, destroying in a large measure the ridges which would otherwise be formed by the disk rollers 14. The hammer action of the sprocket wheels is accentuated because of the staggered teeth.

In Figs. 5 and 6 is shown a modified form of the invention in which the sprocket wheel has teeth which are forwardly pitched, but which are not forwardly curved and in which the teeth all lie in substantially the same plane instead of being staggered, as in the form previously described. The action of his sprocket wheel is pretty much that of the other form, but in a smaller degree.

One or both of the gangs may be supplied with sprocket wheels, or only a single gang may be used.

While I have shown and described but a few embodiments of my invention, it is to be understood that it is capable of many modifications. Changes, therefore, in the construction may be made which do not depart from the spirit and scope of the invention as disclosed in the appended claims.

I claim:

1. In a soil pulverizer, a frame, a shaft journaled in the frame, a series of pulverizer disks rotatably mounted on the shaft, and a toothed wheel loosely mounted between each two adjacent disks, said wheel having a series of staggered teeth.

2. In a soil pulverizer, a frame, a shaft journaled in the frame, a series of pulverizer disks rotatably mounted on the shaft, and a toothed wheel loosely mounted between each two adjacent disks, said wheel having a series of forwardly projecting curved teeth.

3. In a soil pulverizer, a frame, a shaft journaled in the frame, a series of pulverizer disks rotatably mounted on the shaft, and a toothed wheel loosely mounted between each two adjacent disks, said wheel having a series of forwardly projecting teeth.

4. In a soil pulverizer, a frame, a shaft journaled in the frame, a series of pulverizer disks rotatably mounted on the shaft, and a toothed wheel loosely mounted between each two adjacent disks, said wheel having a series of forwardly projecting curved chisel-point teeth.

5. In a soil pulverizer, a frame, a shaft journaled in the frame, a series of pulverizer disks rotatably mounted on the shaft, and a toothed wheel loosely mounted between each two adjacent disks, said wheel having a series of forward curved and laterally staggered teeth.

6. In a soil pulverizer, a frame, a shaft journaled in the frame, a series of pulverizer disks rotatably mounted on the shaft, spacer members on said shaft between said disks, and a toothed wheel loosely mounted between each two adjacent disks on a spacer member, said wheel having a series of forwardly curved and laterally staggered teeth.

7. A spade wheel comprising a body portion provided with a hub and having a cylindrical flange and rim, and a thin apertured web interconnecting the rim and the hub, and a plurality of teeth projecting out from the rim, alternate ones of said teeth being deflected laterally in opposing directions.

8. A spade wheel comprising a body portion provided with a hub and having a cylindrical flange and rim, and a thin apertured web interconnecting the rim and the hub, and a plurality of teeth projecting out from the rim, alternate ones of said teeth being deflected laterally in opposing directions, each of said teeth projected in a general forward circumferential direction.

9. In a soil pulverizer, a frame, a shaft journaled in the frame, a series of pulverizer disks rotatably mounted on the shaft, and a toothed wheel loosely mounted between each two adjacent disks, said wheel having a series of forwardly and laterally curved and laterally staggered teeth.

10. In a soil pulverizer, a frame, a shaft journaled in the frame, a series of pulverizer disks rotatably mounted on the shaft, spacer members on said shaft between said disks, and a toothed wheel loosely mounted between each two adjacent disks on a spacer member, said wheel having a series of forwardly projecting teeth.

In testimony whereof, I have hereunto set my hand this 29th day of December, 1929.

MYRON D. MILLER.